United States Patent [19]
Rasmussen

[11] Patent Number: 5,797,994
[45] Date of Patent: *Aug. 25, 1998

[54] FLUID RETENTION STATION

[75] Inventor: Royce Calvin Rasmussen, South Jordan, Utah

[73] Assignee: Royce Industries, L.C., Salt Lake City, Utah

[*] Notice: The term of this patent shall not extend beyond the expiration date of Pat. No. 5,597,001.

[21] Appl. No.: 739,581

[22] Filed: Oct. 30, 1996

Related U.S. Application Data

[63] Continuation-in-part of Ser. No. 489,222, Jun. 12, 1995, Pat. No. 5,597,001.
[51] Int. Cl.$^6$ ............................................. B08B 3/02
[52] U.S. Cl. ......................... 134/10; 134/104.2; 134/111
[58] Field of Search ........................ 134/104.2, 123, 134/201, 111, 10; 137/312

[56] References Cited

U.S. PATENT DOCUMENTS

| | | | |
|---|---|---|---|
| 4,300,721 | 11/1981 | Rich | 134/123 |
| 5,423,339 | 6/1995 | Latimer | 134/104.2 |
| 5,560,782 | 10/1996 | Latimer | 134/123 |

FOREIGN PATENT DOCUMENTS

| | | | |
|---|---|---|---|
| 1242115 | 6/1957 | Germany | 134/123 |
| 57-172858 | 10/1982 | Japan | 134/123 |

OTHER PUBLICATIONS

Eurpoean Patent Application 41,087.

*Primary Examiner*—Frankie L. Stinson
*Attorney, Agent, or Firm*—Thorpe, North & Western, LLP

[57] ABSTRACT

The present invention relates to a fluid retention station for receiving a fluid that may be washed, flushed or drained from a vehicle and retaining the fluid. The station includes a plurality of layers for providing a floor to overlie existing terrain and includes at least a berm pad layer and a porous layer. The berm pad layer contains a floor and walls which provide a fluid tight enclosure. The porous layer overlays the berm bad layer and receives the fluid and allows the fluid to flow through to the berm pad layer. The porous layer removes any contaminants too large to pass through the porous layer or which have an affinity for a surface of the porous layer. A ground pad layer may also be used to underlie the berm pad layer. In addition, a track layer may be used to overlay a portion of the flooring to protect it from the vehicle or other equipment. A vehicle or other equipment is placed on the flooring layers within the enclosure where fluid from the vehicle is retained rather than being allowed to run onto the underlying terrain where it can present environmental problems or be difficult to clean up. The retained liquid can then be properly disposed of.

20 Claims, 4 Drawing Sheets

5,797,994

1

FLUID RETENTION STATION

REFERENCE TO RELATED APPLICATIONS

This application is a continuation-in-part of application Ser. No. 08/489,222 for a PORTABLE EQUIPMENT WASH STATION WITH RETRACTABLE FLOORING SYSTEM, filed Jun. 12, 1995 now U.S. Pat. No. 5,597,001.

BACKGROUND

1. The Field of the Invention

This invention relates generally to retaining fluids from vehicles and other equipment and more specifically to a portable fluid retention station employing a flooring system for collection of fluid from vehicles or equipment.

2. The Background Art

It is often desirable to retain fluids and contaminants from vehicles or equipment. This is true for vehicles and equipment being stored, flushed out, repaired, serviced or cleaned. It is often preferable to retain these fluids rather than to let them run onto the underlying terrain where they can present environmental problems and may be difficult to clean up.

Ways for retaining fluid have been developed in the art of washing vehicles and equipment. Automatic and manual wash equipment typically use a service bay in which the cleaning action takes place. Wash service bays usually have concrete flooring and are permanently installed in a given location. Such service bays are often constructed in a convenient location or near a fuel station.

Stations that are portable to varying degrees are also known. These stations are designed for relative ease of construction and tear down and use an open beam or lattice construction. The components of such a service bay are transported to a site where the service bay is then erected.

One type of flooring system sometimes used in portable wash stations involves the use of a vinyl sheet. The sheet is unrolled or otherwise spread on the ground or pad where washing is to take place. The vehicle to be washed is moved onto the vinyl sheet for cleaning and washing. The vinyl sheet provides a relatively inexpensive floor that can be erected and disassembled quickly.

Vinyl sheeting may also be used as a floor when flushing or draining fluids from a vehicle or equipment or engaging in repairs or services where fluids are involved. It may also be used when there is leaking or dripping fluid. Vinyl sheeting is also relatively easily cleaned. By employing a vinyl flooring, cross contamination between consecutive vehicles or equipment can be substantially reduced or eliminated. The vinyl sheeting also provides a barrier between the fluid and the terrain where it is undesirable to have the fluid going into the ground, onto a pad in a garage or driveway, or onto the floor of a structure such as a building, rail car, ship deck or the like. This may be of particular importance where the vehicles or equipment have been exposed to potentially hazardous or toxic waste and cross contamination is highly undesirable.

Unfortunately, such vinyl sheeting floors have a number of drawbacks. One is the relative fragility of such sheets. Vinyl sheets may tear, wear through, or otherwise become damaged, particularly if the vehicles being cleaned are heavy equipment or tracked vehicles. The cleaning of heavy equipment on a vinyl sheet may necessitate the use of an expensive heavy duty sheet, the frequent replacement of sheets, or both.

Fluids from a vehicle may contain any number of contaminants that need to be separated from the fluid. Some

2 contaminants, such as mud, metal filings, rocks and dirt, may clog drains or recycling systems. Other contaminants may be toxic, corrosive or otherwise hazardous and require neutralization or separation. Neither the vinyl sheeting nor the permanent floors in the art either neutralize or separate contaminants from the fluid.

Wash liquids may be used to clean flooring as well as vehicles and equipment. Cleaning systems, particularly vehicle cleaning systems, are known to incorporate wash liquid recycling systems. Such a recycling system is taught in parent copending U.S. patent application Ser. No. 08/489, 222, filed Jun. 12, 1995.

Unfortunately, cleaning systems are typically geared toward water conservation only. Although water conservation is an important issue, other issues arise with regard to wash liquid containing contaminates if the vehicle or equipment is used in cleaning up of environmentally hazardous areas such as those containing toxic waste. In such instances, it is imperative to retain the fluids and contaminants from the vehicle or the equipment while equipment is stored, repaired, serviced or washed. These issues are not adequately addressed by currently available systems that were not designed with such needs in mind.

It would therefore be an advancement in the art to provide a portable fluid retention station that requires minimal set up, can be self contained, and can retain fluids from a vehicle or equipment for later disposal.

OBJECTS AND SUMMARY OF THE INVENTION

It is therefore an object of the present invention to provide a portable fluid retention station that retains fluid from a vehicle or other equipment.

It is another object of the invention to provide such a fluid retention station that includes a layered flooring that separates contaminants from fluid.

It is another object of the invention to provide such a fluid retention station to provide containment of environmentally hazardous or toxic materials for later proper disposal.

It is another object of the invention to provide such a portable fluid retention station that may be readily deployed.

It is another object of the invention to provide such a fluid retention station that includes a flooring that does not easily tear or puncture, but is durable and will withstand substantial wear and tear.

It is a still further object of the present invention to provide a portable retention station comprising a layered flooring that can be deployed over a variety of terrain.

It is a still further object of the present invention to provide a flooring that can be easily cleaned.

An additional object of the present invention is to provide a flooring system that contains contaminants, fluid and wash liquid for routing to recycling, storage, or disposal as desired in a particular application.

The above objects and others not specifically recited are realized in a specific illustrative embodiment of a fluid retention station for receiving a fluid from a vehicle or other equipment and retaining the fluid. The station includes a plurality of layers for providing a floor to overlie existing terrain where one layer contains walls which provides a fluid tight enclosure. A vehicle or equipment may then be placed on the floor and fluid from the vehicle or equipment may be retained within the enclosure. The flooring layers include at least a porous layer and a berm layer having walls forming an enclosure. The porous layer receives the fluid and allows the fluid to flow through to the berm layer and the berm layer confines the fluid within the enclosure.

Various fluids may be retained with the fluid retention station. In some circumstances, the fluid may be wash liquid containing contaminants or the fluid may have been flushed or drained out of a vehicle or equipment. In other instances, the fluid may be leaking or dripping from a vehicle. The fluid retention station retains such fluids rather than allowing the fluid to run onto the underlying terrain where they can present environmental problems, various hazards and may be difficult to clean up.

BRIEF DESCRIPTION OF THE DRAWINGS

The above and other objects, features and advantages of the invention will become apparent from a consideration of the subsequent detailed description presented in connection with the accompanying drawings in which.

DETAILED DESCRIPTION OF THE PREFERRED EMBODIMENTS

Figure 1:
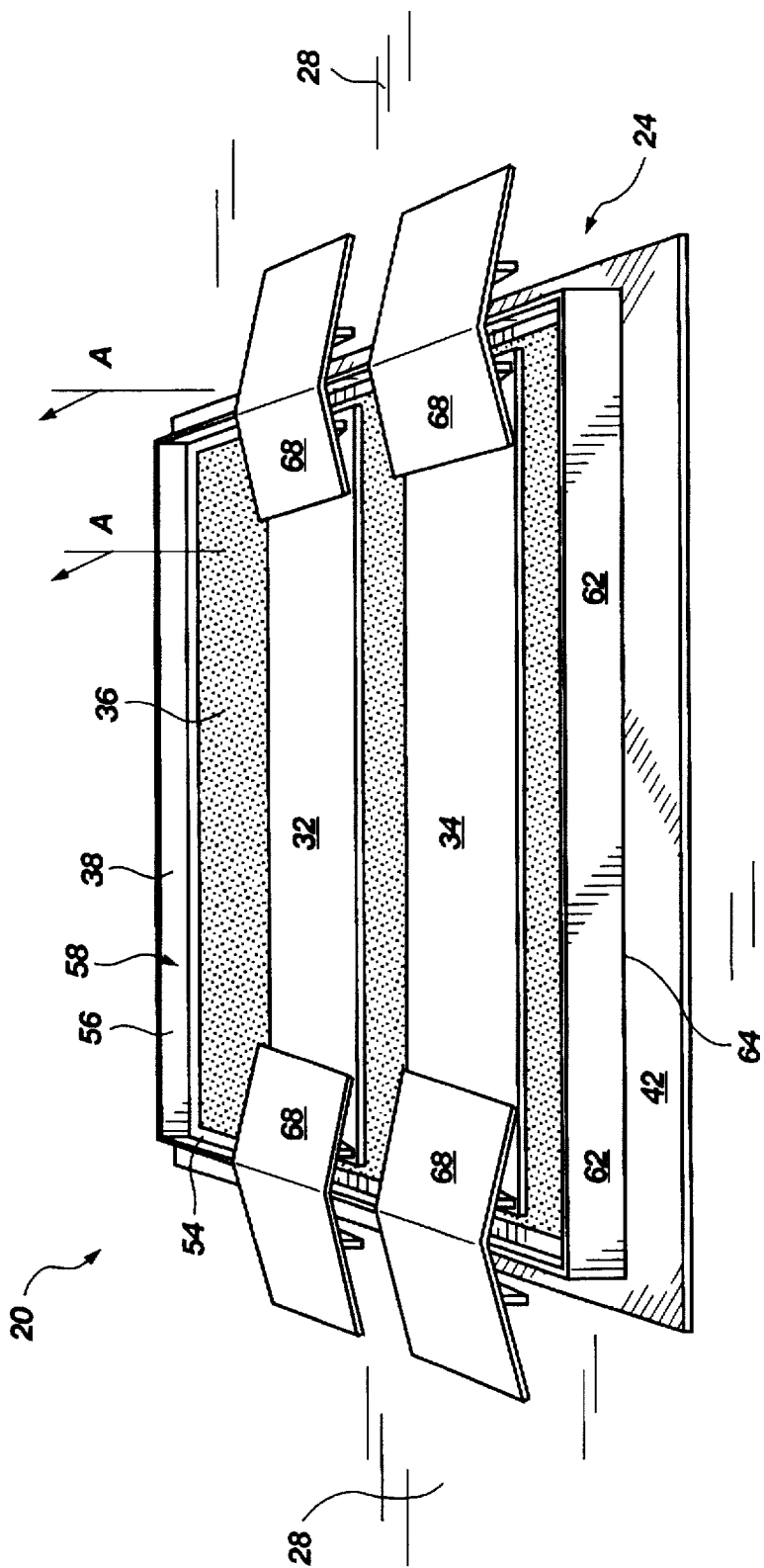
FIG. 1 is a top perspective view of the fluid retention station made according to one embodiment of the present invention.

Reference is now made to the embodiments and methods illustrated in FIGS. 1 through 4 in which like numerals are used to designate like parts throughout this specification. FIG. 1 shows a preferred embodiment of the fluid retention station, indicated at 20, for receiving and retaining fluid (not shown) from a vehicle and other equipment. The station 20 includes a plurality of layers, indicated at 24, for providing a floor to overlie existing terrain 28 and on which to place a vehicle or other equipment (not shown).

A variety of fluids may be retained by the fluid retention station 20. The fluid may be a wash liquid used to clean the vehicle or equipment. The fluid flushed or drained out of the vehicle or equipment may be fuel, lubricants, or hydraulic fluids. The fluid may also be leaking or dripping from the vehicle or equipment. Usually, the fluid will contain one or more contaminants which may be either liquids or particulate solids. However, it is to be understood that the fluid retention station 20 may be used where the fluid is not contaminated, yet needs to be retained.

As shown in FIG. 1, a preferred embodiment of the station 20 may comprise as many as four layers, a track layer 31, shown as the track strips 32 and 34, a porous layer 36, a berm layer 38 and a base or ground pad layer 42. In the preferred embodiment for retaining fluid from heavy equipment, the track strips 32 and 34 at least partially overlie the porous layer 36, which in turn at least partially overlies the berm layer 38, and the berm layer 38 in turn at least partially, and preferably substantially, overlies the base or ground pad layer 42. In its most fundamental embodiment, the station 20 comprises only the porous layer 36 and the berm layer 38.

The porous layer 36 is made of a material that receives the fluid from the vehicle or equipment and allows the fluid to pass through to the berm layer 38. The porous material reduces and controls splashing of the fluid and helps to control the flow rate of the fluid to the berm layer 38. Additionally, the porous layer 36 helps to control and prevent fluid from spreading into areas outside the station 20 by receiving and directing the fluid to the berm layer 38. When in use, the layers 24, of retention station 20 are positioned on the terrain 28 such that there is a low point or depression in the terrain forming a collection location in the floor or flat surface area 54 of berm layer 38 and within the confines of enclosure 58, as will be described below, to which the fluid migrates for collection or removal, e.g. by pumping or drainage means. In one embodiment, the porous layer might cover only the collection location of the berm layer to separate solid particles from the liquid. The solid particles can then be removed from the porous layer and liquid can be separately removed from the enclosure defined in the berm layer. In other words, the porous layer 36 will at least cover the portion of the berm layer 38 at the collection location from which fluid is to be collected or removed and may, if desired, cover the entire floor or flat surface area 54 of the berm layer 38.

The porous layer 36 is preferably constructed of a porous material, such as porous rubber, porous plastic, or a mesh material that allows liquids and other materials to flow through and be collected and retained in the enclosure 58 of berm layer 38. Mesh materials such as nylon mesh, flexible graphite screen or other screen material may also be employed.

Figure 2:
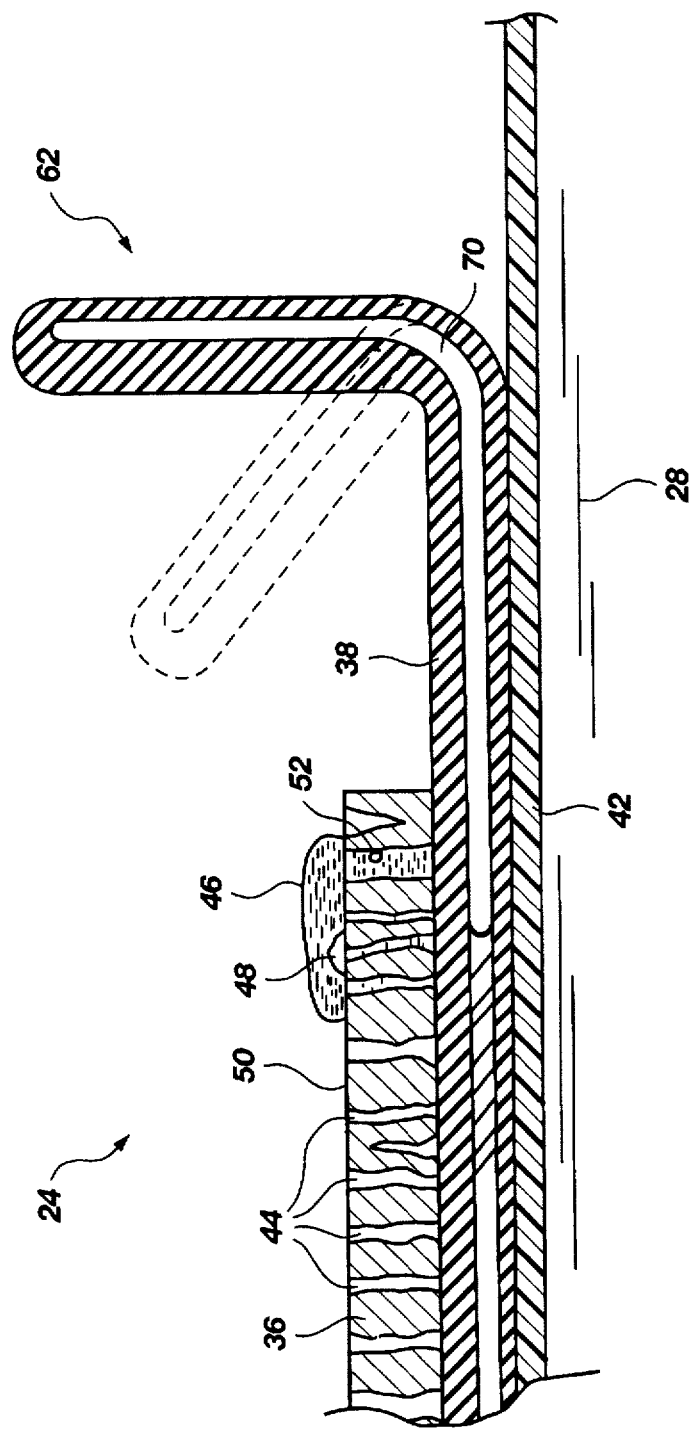
FIG. 2 shows a cross sectional view the invention along A—A of FIG. 1.

Referring to FIG. 2 there is shown a cross sectional view of the plurality of layers 24, comprising porous layer 36, berm layer 38 and base or ground pad layer 42 taken along section line A—A of FIG. 1. In FIG. 2 the openings 44 in the porous layer 36 are shown. Those skilled in the art will appreciate that the number and size of openings 44 in the porous material may be adjusted depending upon the application and the nature of the fluid 46 involved. For example, when the fluid 46 contains a particulate contaminant 48 such as a solid waste, it may be important to collect and recycle or dispose of solid particles 48. It will be desirable to use a porous layer 36 having openings 44 sized to maintain the solid particles 48 on the upper surface or top 50 of layer 36 and only allow fluid 46, which may contain minimal sediment or other impurities, to pass through to the berm layer 38. In other applications, it may be preferred to have openings 44 in the porous layer 36 that are sufficiently large to allow larger particles to flow through.

The porous layer 36 may also be used to physically or chemically bind contaminants. The porous layer 36 may be formed to include substances that physically or chemically bind certain contaminant particles or molecules 52 either on the upper surface 50 or to the walls of the openings 44 of the porous layer 36. For example, magnetic or hydrophilic binding could physically bind contaminant particles 52 to the walls of the openings 44. On the other hand, chemical binding could similarly include any means known to those skilled in the art, including the formation of ionic or covalent bonds between the contaminant molecules 52 and surfaces of the porous layer 36.

The number of openings per unit area and size of the openings 44 in the porous layer 36 may also be varied to aid in extending the life of any associated cleaning or recycling equipment. For example, if the recycling equipment is designed to handle solid materials in a certain size range, the openings 44 may be adjusted to allow only particles smaller than a particular size to pass.

Referring back to FIG. 1, it is shown that porous layer 36 overlies the berm layer 38. The berm layer 38 comprises a substantially fluid impermeable material for containing fluid from a vehicle or other equipment. The berm layer 38 has a generally flat surface 54 and an upwardly extending perimeter wall section 62 defining an enclosure 58 in which fluid can be retained. The perimeter wall 62 functions to trap and hold fluid. It will be appreciated that the size of the enclosure 58 may vary, depending upon the use and the area of the terrain to be covered. While the perimeter wall section 62 is designed to form a berm or partial wall around the perimeter 64 of berm layer 38 to form enclosure 58, the wall does not necessarily have to be at the perimeter 64, but may be disposed inwardly from the perimeter 64. The enclosure 58 defines a capture basin that maintains substantially all fluids and other materials within the confines of berm layer 38. As noted above, this will preferably be positioned over the terrain where there will be a depression or low point such as to form a collection location within the enclosure 58. The fluid and other materials may then be removed from the enclosure by pumping, drainage or other means and recycled or stored.

The berm layer 38 is preferably made of a vinyl coated nylon material although other waterproof or substantially water-resistant materials such as rubber, plastic or waterproof fabric can be employed. The berm layer 38 can be made of perforation resistant material, which may be particularly appropriate if the station 20 does not employ either track strips 32 and 34 or a base layer 42.

Referring again to FIG. 2, there is shown a partial cross sectional view of the berm layer 38 illustrating the juncture of the flat floor surface or bottom 54 and berm wall 62. An L-shaped plastic or metal spring 70 is encased into berm layer 38, preferably at the perimeter, so as to be an integral part thereof with one arm extending inwardly as part of the flat floor surface 54 and the other arm tensioned to extend upwardly as part of the berm wall 62. Spring 70 can be either continuous or a series of spaced apart spring members. Spring 70 may be made integral with the berm layer by various conventional means. Depending upon the material from which berm layer 38 is made, it may be molded or sewn into the perimeter. In the alternative, a cavity or opening may be created either through molding, or a hem may be sewn it the perimeter and the spring inserted in the cavity. When not under pressure, spring 70 assumes an L-shape such that berm wall 62 is at approximately right angles to the flat floor surface 54. In this embodiment, the wall 62 is designed to fold flat against the floor surface 54 when sufficient pressure is exerted against wall 62 collapsing the spring member 70, such as would be the situation if a vehicle was to be driven onto the berm layer 38 or that layer was to be folded or rolled for storage purposes. This greatly simplifies storage of the berm layer and also facilitates the movement of a heavy vehicle onto the berm layer for cleaning or fluid drainage while minimizing any spillage or drainage of fluid from within the confines of enclosure 58.

Instead of being raised by a spring as shown in FIG. 2, an inflatable berm wall can be utilized. An airtight pocket can be formed contiguous with the material of the berm pad. This pocket can be formed around the perimeter of berm pad or spaced inwardly. When being deployed or retracted this pocket will be deflated. Once berm pad is deployed, the pocket can be inflated to form a berm wall defining an enclosure.

In either embodiment, it is apparent that wall 62 and floor 54 of berm pad 38 are joined in a fluid tight relationship.

The berm layer 38 overlies a base or ground pad layer 42. The base layer 42 is preferably made of vinyl coated nylon although other perforation resistant material such as treated canvas or other tarpaulin material could be employed. The base layer 42 is adapted to overly the terrain, i.e. soil, gravel, concrete or wood flooring, etc., and protects the other layers, and particularly the berm layer 38, from sharp stones, jagged or rough surfaces, and other surface anomalies that might damage the other layers. Because it is sometimes necessary to remove liquids from heavy equipment in a variety of areas such as mountains, deserts, creek beds, agricultural lands, mining sites, military locations, remediation sites, etc., the base or ground pad layer may be indispensable to the functionality of the berm pad and porous layers.

Also, a track layer to accommodate the tracks or wheels of equipment driven onto the retention station 20 may also be desired to optimize the functionality of the station. The track layer shown in FIG. 1 has two track strips 32 and 34, although the invention may be practiced with any number of strips or layers of material providing a track layer. The track strips 32 and 34 are made of perforation resistant material. Perforation resistant means materials that resist punctures, tears, rips, cuts, or abrasions. Preferably, the track strips 32 and 34 are constructed of potato belting material or heavy duty materials such as canvas, rubber, nylon fabric, or other heavy fabric. One skilled in the art will appreciate any perforation resistant material may be used, including: wood boards, metal sheets, fabrics, mats, pads or any other perforation resistant material.

A perforation resistant material is required for the strips 32 and 34 because the materials of the porous layer 36 and the berm layer 38 are susceptible to damage from vehicles or other equipment. An especially severe example would be the movement of a tracked or endless metal belt propelled vehicle, such as a military tank, onto the layers 24 of station 20 for cleaning. Without track strips 32 and 34 the metal tracks of the tank may gather and rip the material of the porous and berm layers 36 and 38. By employing track strips 32 and 34, damage is reduced or avoided entirely.

Track strips 32 and 34 may also be constructed as an integral part of the porous layer 36 or the berm layer 38. This may be accomplished by enclosing track strips 32 and 34 between layers of the porous layer 36 or layers of the berm layer 38. Besides enclosing the track strips 32 and 34 between layers, there are a variety of other means by which the track strips 32 and 34 could be incorporated into the porous layer 36 or berm layer 38 known to those skilled in the art.

Typically it is most effective to use a track layer having track strips 32 and 34 that are easily serviceable or replaceable. There are many reasons the track strips 32 and 34 may need to be replaced. The track strips 32 and 34 may deteriorate over time and with extended use. A defect or extended use may cause holes or other damage requiring the replacement of a track strip 32 or 34. Additionally, if the station 20 is used to clean or flush vehicles or equipment having a particularly hazardous or toxic contaminant, the track strips 32 and 34 may need to be removed. In such circumstances, the track strips 32 and 34 of the track layer should be easily replaceable.

Track strips 32 and 34 may be attached to the porous layer 36, or if desired to the berm layer 38, by sewing, adhesive, or any other method that forms a bond adequate to hold up in the conditions under which the station 20 will be used.

The track strips 32 and 34 preferably overlie the porous layer 36. However, these strips are positioned such as not to interfere with the vertical position of walls 62 forming the perimeter of enclosure 58. Strips 32 and 34 may be sized to be totally within the confines of enclosure 58. In the alternative, access ramps 68 may be employed to protect the wall 62 from injury and to confine all fluids and materials within the enclosure 58 of berm layer 38. Access ramps 68 are designed to allow a vehicle or other equipment to drive over the wall 62 without displacing or crushing it. Although both a springing berm and an inflatable berm may be designed to be driven over, use of access ramps 68 can extend the life of either design. It is also possible to construct track strips 32 and 34 such that each has an access ramp 68 contained therein as an integral part.

The use of access ramps 68 can also help to insure that little if any of the fluids captured within enclosure 58 of berm layer 38 are allowed to escape. This is particularly crucial in applications where toxic or environmentally hazardous materials are involved. The present system may be employed to help contain toxic or hazardous materials and prevent their spread; thus, it is critical to insure that as much of such material as possible is contained within enclosure 58 of berm layer 38.

When access ramps 68 are not employed, it will be necessary to ensure that wall 62 is in an upstanding or vertical position following the movement of a vehicle onto the fluid retention station 20 so as to be within the enclosure 58.

Figure 3:
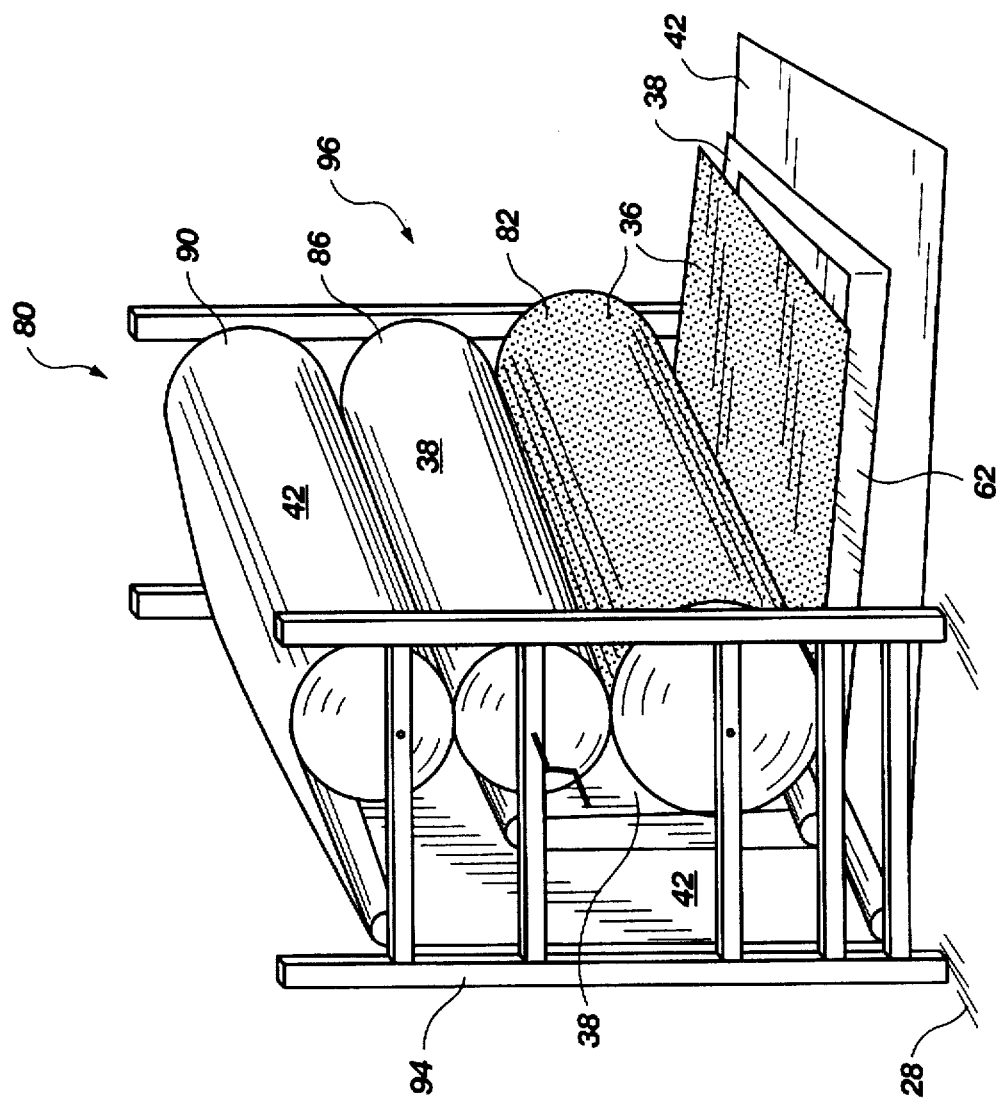
FIG. 3 is a perspective view of the invention of FIG. 1, further showing a retraction means.

The various members of the plurality of layers 24 may be placed over existing terrain one layer at a time in separate operations. In rugged or difficult terrain, this might be the only way to deploy the various layers. Alternatively, these can be arranged on a portable roller system. FIG. 3 depicts rollers, generally indicated at 80, on which the various layers 24 may be stored. The preferred embodiment employs three rollers, a first roller 82, a second roller 86, and a third roller 90. A frame 94 houses the three rollers. Care should be taken to fabricate a frame 94 to accommodate the weight of the rollers 80 and the layers 24 without deflecting or swaying to such an extent that proper operation of the system is impaired. First roller 82, second roller 86, third roller 90 and roller frame 94 collectively are referred to as roller bar assembly 96.

Those skilled in the art will appreciate there are many alternate configurations possible for a roller bar assembly 96. In the preferred embodiment, the first roller 82 is positioned closest to the terrain 28 and accommodates the porous layer 36. Second roller 86 is positioned above first roller 82 and accommodates the berm layer 38, including the wall 62 which is in a folded or deflated position. Third roller 90 is positioned above second roller 86 and accommodates the base layer 42. The placement of the first roller 82, second roller 86 and third roller 90 above one and another allows for maximization of use of space. In addition, the rollers are substantially independent from one another and thus unlikely to interfere with each other. Also, the stacked arrangement allows for efficient design of frame 94 and shared use of deployment means.

When mounted on rollers, all three layers 36, 38 and 42 are required to have some excess length that will remain in engagement with the respective roller 82, 86 and 90 even when the layers are fully deployed. As will be further appreciated, porous layer 36 requires the least additional length due to its engagement with first roller 82 that is positioned closest to the terrain 28. The berm layer 38 requires a somewhat longer extra length, approximately equal to the height of the distance from the second roller 86 to the terrain 28, due to its engagement with second roller 86 located intermediate to first roller 82 and third roller 90. The base layer 42 requires the greatest additional length, again approximately equal to the height of the third roller 90 from the terrain 28, due to its interaction with third roller 90 that is located farther from the terrain 28.

In practicing the invention, typically the base layer 42 is deployed first to cover the terrain 28. The berm layer 38 is deployed second and overlies the base layer 42. Next, the porous layer 36 is deployed and at least partially, and perhaps completely, overlies berm layer 38. Finally, the track layer, comprising the track strips 32 and 34, is deployed and at least partially overlies the porous layer 36 or is positioned to be adjacent to ramp means 68.

The vehicle or equipment from which fluid is to be retained is positioned on the fluid retention station 20 to be within the enclosure 58 defined by the floor 54 and wall 62 of berm pad 38. The track pads 32 and 34 may provide a resting means for the vehicle and porous layer 36 will overlie floor 54 at least at the collection location and may completely cover floor 54. The operation to be performed, i.e. washing the vehicle, drainage of fluids, etc., is accomplished by any desired means and the fluid is allowed to move through the porous layer where particles or contaminants are removed as indicated in the above description. The fluid within the enclosure, preferably at a collection location, is then removed from within the enclosure by means of pumping, draining, and the like.

Figure 4:
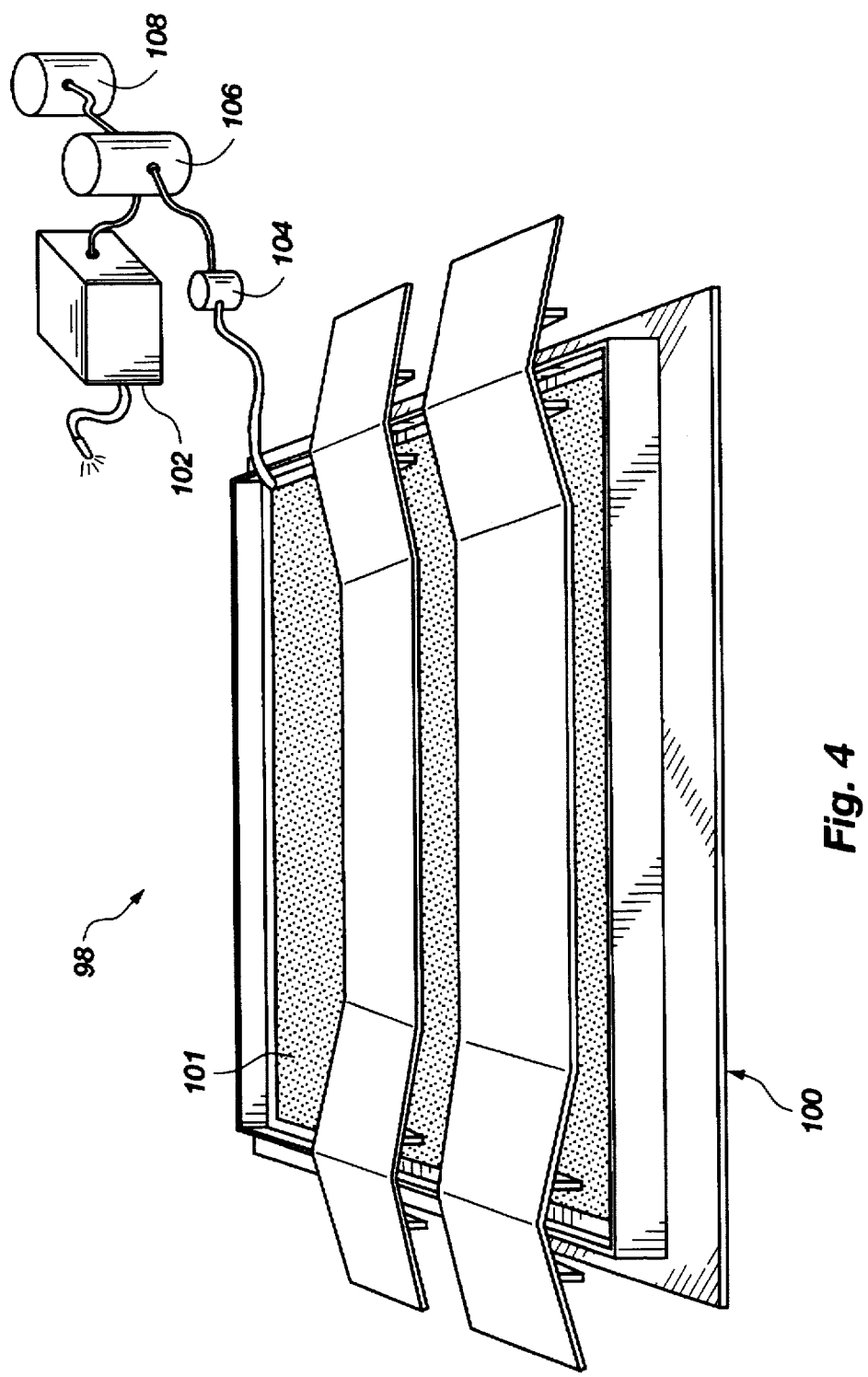
FIG. 4 is a perspective view of an alternate embodiment of the invention of FIG. 1, showing an applicator, recycler, and fluid storage.

FIG. 4 shows an alternate embodiment of the fluid retention station 100, including a plurality of layers 101, wash liquid applicator 102, sump pump 104, recycler 106 and fluid storage 108. In the utilization of this embodiment, the method and apparatus taught in copending parent application, Ser. No. 08/489,222, including those regarding the applicator 102, sump pump 104, recycler 106, fluid storage 108, as well as the roller bar assembly 96 may be employed and applied in the practice of the invention herein.

Although this invention has been described and illustrated by reference to a preferred embodiment, this is exemplary only and the invention is limited only in scope by the following claims and functional equivalents thereof.

What is claimed is:

1. A portable station for the receiving and retaining fluids from vehicles and other equipment comprising:

a plurality of flooring layers for providing a floor to overlie existing terrain and on which to place a vehicle or other equipment from which fluid is to be received comprising:

a berm pad layer comprising a substantially fluid impermeable bottom and contiguous flexible upwardly extending sidewalls said bottom and sidewalls defining a fluid tight enclosure adapted to receive and encircle the portions of said vehicle or other equipment from which fluid is to be received and to retain said fluid within said enclosure; and a porous layer overlying at least a portion of said bottom of said berm pad layer within said enclosure through which fluid must pass to a collection location within said enclosure to remove from said fluid any contaminants which are too large to pass through the pores of said porous layer or which have an affinity for a surface of said porous layer thereby yielding fluid at the collection location containing reduced amounts of said contaminants.

2. A portable station according to claim 1 wherein said plurality of flooring layers further comprises:

a ground pad layer underlying said berm pad layer for covering the existing terrain and providing protection to the berm pad and porous flooring layers.

3. A portable station according to claim 1, wherein said plurality of flooring layers further comprises:

a track layer overlying a portion of said porous layer within said enclosure for providing protection to said flooring layers from tires or tracks of said vehicles or other equipment.

4. A portable station according to claim 1, wherein said portable station further comprises:

an access ramp allowing said vehicle or other equipment to drive over said sidewall of said berm pad layer without displacing said sidewall and without allowing said fluid captured in said enclosure to escape.

5. A portable station according to claim 1, wherein said portable station further comprises:

a retraction means for retracting said plurality of flooring layers.

6. A portable station according to claim 1, wherein said portable station further comprises:

an applicator means for applying a wash liquid to said vehicles or other equipment.

7. A portable station according to claim 1, wherein said portable station further comprises:

a recycle means for recycling said wash liquid.

8. A portable station according to claim 1, wherein said portable station further comprises:

a fluid storage means for storing liquid from said plurality of flooring layers.

9. A portable station according to claim 1, wherein said berm pad layer further comprises:

an L-shaped spring having a first arm in contact with said bottom of said berm pad layer and a second arm in contact with said sidewall of said berm pad layer thereby allowing said sidewall to collapse against said bottom when sufficient pressure is exerted against said sidewall and maintaining said sidewall at substantially a right angle with respect to said bottom when said pressure is removed.

10. A portable station according to claim 1, wherein said upwardly extending sidewall of said berm pad layer comprises:

an inflatable airtight pocket.

11. A portable station for receiving and retaining fluids from vehicles or other equipment comprising:

a plurality of flooring layers for providing a floor to overlie existing terrain and on which to place a vehicle or other equipment from which fluid is to be received comprising:

a berm pad layer comprising a substantially fluid impermeable bottom and contiguous flexible upwardly extending sidewalls, said bottom and sidewalls defining a fluid tight enclosure adapted to receive and encircle the portions of said vehicle or other equipment from which fluid is to be received and to retain said fluid within said enclosure;

a porous layer overlying at least a portion of said bottom of said berm pad layer within said enclosure through which fluid must pass to a collection location within said enclosure to remove from said fluid any contaminants which are too large to pass through the pores of said porous layer or which have an affinity for a surface of said porous layer thereby yielding fluid at the collection location containing reduced amounts of said contaminants; and a base layer of perforation resistant material for covering the existing terrain, said base layer underlying and protecting the berm layer.

12. A portable station according to claim 11, wherein said plurality of flooring layers further comprises:

a track layer overlying a portion of said porous layer within said enclosure for providing protection to said flooring layers from tires or tracks of said vehicles or other equipment.

13. A portable station according to claim 11, wherein said portable station further comprises:

an access ramp allowing said vehicle or other equipment to drive over said sidewall of said berm pad layer without displacing said sidewall and without allowing said fluid captured in said enclosure to escape.

14. A portable station according to claim 11, wherein said portable station further comprises:

a retraction means for retracting said plurality of flooring layers.

15. A portable station according to claim 11, wherein said portable station further comprises:

an applicator means for applying a wash liquid to said vehicles or other equipment.

16. A portable station according to claim 11, wherein said portable station further comprises:

a recycle means for recycling said wash liquid.

17. A portable station according to claim 11, wherein said portable station further comprises:

a fluid storage means for storing liquid from said plurality of flooring layers.

18. A portable station according to claim 11, wherein said berm pad layer further comprises:

an L-shaped spring having a first arm in contact with said bottom of said berm pad layer and a second arm in contact with said sidewall of said berm pad layer thereby allowing said sidewall to collapse against said bottom when sufficient pressure is exerted against said sidewall and maintaining said sidewall at substantially a right angle with respect to said bottom when said pressure is removed.

19. A portable station according to claim 11, wherein said upwardly extending sidewall of said berm pad layer comprises:

an inflatable airtight pocket.

20. A method for deploying a portable fluid containment flooring system comprising the steps of:

(a) deploying a base layer of perforation resistant material for covering the existing terrain;

(b) deploying a berm pad layer comprising a substantially fluid impermeable bottom and contiguous flexible upwardly extending sidewalls, said bottom and sidewalls defining a fluid tight enclosure adapted to receive and encircle the portions of said vehicle or other equipment from which fluid is to be received and to retain said fluid within said enclosure; and (c) deploying a porous layer overlying at least a portion of said bottom of said berm pad layer within said enclosure through which fluid must pass to a collection location within said enclosure to remove from said fluid any contaminants which are too large to pass through the pores of said porous layer or which have an affinity for a surface of said porous layer thereby yielding fluid at the collection location containing reduced amounts of said contaminants.

* * * * *